United States Patent
Colpaert et al.

(10) Patent No.: US 6,818,686 B1
(45) Date of Patent: Nov. 16, 2004

(54) WATER BASED POLYMER COMPOSITION COMPRISING A BIOPOLYMER AND A POLYMER RESIN

(75) Inventors: Marc Colpaert, Ghent (BE); Dirk Bontinck, Ertvelde (BE); Patrice Roose, Halle (BE)

(73) Assignee: UCB, S.A., Brussels (BE)

( * ) Notice: Subject to any disclaimer, the term of this patent is extended or adjusted under 35 U.S.C. 154(b) by 198 days.

(21) Appl. No.: 10/111,669

(22) PCT Filed: Oct. 28, 2000

(86) PCT No.: PCT/EP00/10503
§ 371 (c)(1),
(2), (4) Date: Jul. 8, 2002

(87) PCT Pub. No.: WO01/30905
PCT Pub. Date: May 3, 2001

(30) Foreign Application Priority Data

Oct. 28, 1999 (EP) .............................................. 99121449

(51) Int. Cl.$^7$ .............................. C08L 1/02; C08L 3/04; C08L 5/00; C08L 89/00; C09D 103/04
(52) U.S. Cl. .............................. 524/17; 524/21; 524/22; 524/27; 524/35; 524/47; 524/55
(58) Field of Search ............................... 524/17, 21, 22, 524/27, 35, 47, 55

(56) References Cited

U.S. PATENT DOCUMENTS

| 5,362,777 | A | * | 11/1994 | Tomka ......................... 524/47 |
| 5,439,953 | A | * | 8/1995 | Ritter et al. .................. 524/47 |
| 5,512,617 | A | * | 4/1996 | Ritter et al. .................. 524/47 |
| 6,011,092 | A | * | 1/2000 | Seppala et al. ............... 524/47 |

FOREIGN PATENT DOCUMENTS

| FR | 2 265 762 | 10/1975 |
| WO | 98/29477 | 7/1998 |

* cited by examiner

Primary Examiner—Nathan M. Nutter
(74) Attorney, Agent, or Firm—Wenderoth, Lind & Ponack, L.L.P.

(57) ABSTRACT

The invention relates to a water based polymer composition comprising a biopolymer and a synthetic polymer resin. The biopolymer results from a mechanical thermoplastic processing of a polysaccharide and/or protein starting material using shear forces in the presence of a crosslinking agent. The synthetic polymer resin consists of a water based hydrophilic resin and/or hydrophilic/hydrophobic resin. These compositions have a good storage stability. They are intended for the production of coatings with fair properties.

23 Claims, No Drawings

WATER BASED POLYMER COMPOSITION COMPRISING A BIOPOLYMER AND A POLYMER RESIN

The invention relates to water based resin compositions containing biopolymer, e.g. from starch, in particular in the form of biopolymer nanoparticles having good storage stability. The resins are intended for the production of coatings with fair properties such as adhesion, barrier, solvent and wet resistance, mechanical strength, applicability, durability and film formation when applied to various types of substrates. Along with the introduction of a renewable resource, the presence of a considerable amount of biopolymer leads to an enhanced biodegradable character of the coating.

Various types of polymer coatings containing biopolymers, such as polysaccharides and proteins, are known. For example, starch is utilised in a wide variety of coating applications, whether or not in combination with other polymer resins. For some end-users, it is highly desirable to provide starch compositions in a ready-to-use and coatable form.

Starch dispersions refer to aqueous starch systems where the granular starch structure has partly or totally been disrupted using sufficient work or heat. In excess of water, the process of starch hydration and granule destruction is known as gelatinisation and can be facilitated or impeded by chemical modifications (cf. converted, derivatized or cross-linked starch) ("Starch:Chemsitry and Technology", R. L. Whistler, J. N. BeMiller, E. F. Paschall Eds., Academic Press, London, 1984). Pregelatinisation and physical treatment (e.g. via extrusion, drum- or spray drying) of starch (and derivatives) yields cold-water dispersible systems. Although there is no need for cooking, pregelatinised starch still requires substantial mechanical energy for dispersion in water. The stability of many starch dispersions over time is an additional problem since the amylose fraction, and to a much lesser extent also the amylopectin fraction, shows a strong tendency towards retrogradation, a process of crystallisation resulting in gel formation or precipitation. U.S. Pat. No. 5,032,683 describes the production of a stable aqueous starch composition having a coatable viscosity, wherein the starch has been gelatinised and reacted at temperatures above 70° C. in the presence of a blocked glyoxal compound. However, converted (thin-boiling) and/or chemically modified starch are the advised starch materials for these compositions. The subject matter of U.S. Pat. No. 5,116,890 comprises the preparation of water-dispersible, self cross-link lattices based on a starch hydrolyzate to produce stable emulsions with low viscosity. The process requires undesirable chemicals and is quite laborious.

Blends of starch and synthetic polymers obtained via thermoplastic processing, are also well-known in the art ("Production of Thermo-Bioplastics and Fibers based mainly on Biological Materials", H. G. Fritz, T. Seidenstücker, U. Bölz and M. Juza, EU-Study AGRE-0200-DE, 1994). These materials are usually developed for the production of moulded or shaped articles, not for the preparation of latex compositions for coating purposes. Numerous patents describe the destructuration of starch in combination with hydrophilic and hydrophobic synthetic components, such as vinyl alcohol copolymers (EP 327505, EP 408503), polyvinylesters and polyesters (EP 327505, US 5439953), aliphatic polyesters (WO 92/19680), polylolefines (WO 92/20740), ethylene acrylic acid (EAA) copolymer (US 4133784, US 5262458). In U.S. Pat. No. 5,262,458, it is noted that in the starch/EAA blend after processing part of the destructurized starch (<30% of total starch in the mixture) is found as particles with diameter lower than 1 micrometer.

Recently, a new thermo-mechanical process has been proposed for the production of cross-linked biopolymer material, in particular starch (EP 99200203 patent application). The thermo-mechanical process uses an extrusion treatment at raised temperatures and under conditions of high shear and high pressure. A plasticiser is preferably present during the thermo-mechanical treatment. Most importantly, the process is conducted in the presence of a cross-linking agent. The obtained starch material can readily be dispersed in cold water at increased solids content (up to 40 wt. %), and with relatively low viscosity (typically lower than 100 mPa.s at 25° C. and 10 wt. %) as compared to other cold-water dispersible starches. The size of the dispersed starch particles is in the submicron size range, typically less than 200 nm on the average.

However, the limited storage stability of these colloidal starch dispersions makes them unsuitable for practical application. Depending on the nature of the starch used, shelf life may be as low as a few hours at 20 wt. % before the system turns irreversibly to a gel. Moreover, the sensitivity to humidity of starch is often a restrictive factor for coating application where wet resistance, durability, strength, barrier, etc. are required.

It has now been found that the addition of certain synthetic polymers to the colloidal starch dispersions of EP 99200203 patent application not only imparts desired properties to the coating but surprisingly, also stabilises the aqueous formulation over time. This constitutes the main object of the present invention.

It was found that hydrophilic resins and/or resins with a hydrophilic/hydrophobic character can, surprisingly, stabilise these nanoparticles in water. Upon storage, the compositions exhibit constant particle size and viscosity for at least 1 day up to one month or even more.

The present invention therefore provides a water based polymer composition comprising a biopolymer and a synthetic polymer resin, characterised in that the biopolymer results from a mechanical thermoplastic processing of a polysaccharide and/or protein starting material using shear forces in the presence of a crosslinking agent, and the synthetic polymer resin consists of a water based hydrophilic resin and/or hydrophilic/hydrophobic resin.

According to the invention, the water based polymer resin is in the form of a solution, or a dispersion, or an emulsion or a colloid.

According to the invention, the polymer resin can be an anionic, cationic and/or nonionic modified resin.

According to the invention, the polymer resin is composed of a water based resin which has been selected from polyurethanes, polyesters, polyethers, polyesterurethanes, polyacrylates, polyvinylacrylates, polystyreneacrylates, styrene-butadiene, poly(meth)acrylic acid, polyvinylalcohols, polyvinylacetates, polyvinylethers, polyethylenevinylacetates, polyethylenevinylalcohols, epoxy resin, alkyds, epoxy-, urethane-, polyester-, amino-, and amido-(meth)acrylates, or mixtures thereof.

Preferably, the polymer resin is chosen from polyurethanes, polyester-urethanes, epoxy-acrylates, polyester-acrylates, urethane-acrylates, polyacrylates, polystyrene-acrylates, styrene-butadiene and epoxy resin or mixtures thereof.

According to this particular embodiment, the said polymer resin in the composition may comprise functional groups such as hydroxyl, methylol, carbonyl, carboxyl, sulfonyl, amino, epoxy, acetyl acetoxy, (meth)acrylic and/or vinylic groups.

According to EP 99200203 patent application, in the process for producing the biopolymer nanoparticles, the biopolymer is subjected to thermoplastic processing using shear forces, a crosslinking agent being added during the mechanical treatment.

Thermoplastic processing as used in this context means a thermomechanical treatment, which is in particular an extrusion treatment performed at elevated temperature (above 40° C., especially up to 140° C.) under conditions of high shear and high pressure (e.g. between 5 and 150 bar). The shear can be effected by applying at least 500 J of specific mechanical energy (SME) per g of biopolymer. The elevated temperature can be moderated, in case of starch, by using an alkaline medium or by using pregelatinised starch. During the thermomechanical treatment, the biopolymer is present in high concentration, especially a concentration of at least 40, more preferably at least 50 wt. %, in an aqueous solvent, such as water or a water/alcohol mixture.

It is preferred that a plasticiser is present, such as a polyol (ethyleneglycol, propyleneglycol, polyglycols, glycerol, sugar alcohols, urea, citric acid esters, etc.) at a level of 5–40% by weight of the biopolymer. A lubricant, such as lecithin, other phospholipids or monoglycerids, may also be present, e.g. at al level of 0.5–2.5% by weight.

An essential step in the process is the crosslinking during the thermomechanical treatment. Conventional crosslinkers such as epichlorhydrin and other epoxides, dialdehydes (e.g. glutaraldehyde, glyoxal), triphosphates, divinyl sulphone, can be used for polysaccharide biopolymers, while dialdehydes, thiol reagents and the like may be used for proteinaceous biopolymers. Glyoxal is a particularly suitable crosslinker. The crosslinking reaction may be acid- or base catalysed. The level of crosslinking agent can conveniently be between 0.1 and 10 wt. % with respect to the biopolymer.

After said thermomechanical treatment, the biopolymer can readily be dissolved or dispersed in an aqueous medium to a concentration between 4 and 40 wt. %. This results in starch nanoparticles, which are characterised by an average particle size of less than 200 nm.

The biopolymer material may result from a mechanical thermoplastic processing of biopolymers selected from polysaccharides, such as starch, cellulose, hemicellulose, gums and/or from cereal, vegetable or animal proteins such as wheat gluten, whey protein, gelatin and mixtures and/or modified derivatives thereof.

Preferably, the biopolymer is native or modified starch (e.g. starch-ethers, starch-esters, oxidized starch) from tuber or cereal origin, preferably potato, waxy maize, tapioca or rice.

According to the invention, 2–90%, preferably 2–50% and more preferably 2–30% by weight of the total dry polymer resins is biopolymer.

Colloidal dispersion of cross-linked biopolymer can be added to the water based polymer resin, or conversely the latter can be added to the biopolymer nanoparticle dispersion. Alternatively, the extruded cross-linked biopolymer material can be mixed directly into the aqueous polymer resin.

According to the invention, this may result in a water-based polymer resin composition containing bio- and synthetic polymers, and having a solids content of 5–40% by weight, preferably of 5–30 wt. % and more preferably of 5–20 wt. %. The dry resins may contain up to 90%, preferably up to 50% and more preferably up to 30% by weight of biopolymer material.

According to the invention, these biopolymer and synthetic polymer resin containing compositions may be used as oxygen-barrier coating for paper, plastic or cellophane films and packaging, when combined with copolymers of vinyla-lcohol. In combination with water-based acrylate, styrene-acrylate, styrene-butadiene and vinyl-acetate resins, they may be used for paper and board-upgrading (i.e. adjustment of water-vapour transmission and printability, recycling, compostability). Water-based polyester/starch systems find potential application as textile sizing agent. In combination with epoxy and polyurethane resins, these compositions are respectively applicable as anti-fouling paints, e.g. in marine applications, and wood coatings (primers, lacquers) with fair properties (hardness and mechanical resistance) for parquet and furniture. 1K and 2K systems can be designed which are curable by radiation or oxidation, acid catalysis (with melamine or urea based crosslinkers), or using isocyanate crosslinkers. Stable formulations with pigments and filling material can be developed for water-based inks and paints as well.

Destabilisation of dispersions can occur according to various mechanisms, such as sedimentation (or creaming), coagulation/coascervation (causing flocculation or gelation) and Ostwald ripening. Obviously, extrusion modified starch (EMS) dispersions are subjected to irreversible gelation upon storage, which is quite common for cold-water dispersible starch dispersions (often due to the presence of amylose). This results in an unusable product for coating applications. It can be stated that a mixture of EMS with a polymer resin shows an improved stability if the gelation process is slowed down or impeded with respect to the behaviour of pure EMS. Hence, the composition can be handled over a longer period. In this sense, improved stability of aqueous EMS dispersions is achieved.

The addition of a second synthetic polymer resin to a stable binary EMS/synthetic polymer mixture does not affect the stability negatively, e.g. a composition of poly-acrylate, polyurethane and EMS where at least one synthetic compound independently improves the stability of EMS. Similarly, pigments typically used for water-based inks or paints can be added to a stable binary mixture. It is worth mentioning the reasonable performances of the ink compositions. At typical concentration levels, additives commonly used in paints do not affect the stability negatively in comparison to the individual binary mixture. This is why the present invention also concerns paint and ink formulations based on the polymers compositions described in this specification.

In order to estimate the stability in time of the water based polymer compositions, three methods were utilised, i.e., a) Visual inspection The behaviour of the aqueous preparation as a function of time is evaluated qualitatively by visual inspection.

b) Particle size determination by Dynamic Light Scattering (DLS).

For many preparations, dynamic light scattering is a convenient tool to follow the time-evolution of the average size and the size distribution of the dispersed particles in the composition. This was used as a quantitative indicator of the dispersion stability. The light scattering measurements were performed at 25° C. on a MALVERN Autosizer lo-C instrument equipped with a 8-bit correlator. As long as a tolerable scattered light signal could be measured, samples were diluted with demineralised water to a concentration lower than 0.1 wt. %. At higher concentrations, it was verified that multiple scattering and concentration (interparticle interactions) effects were insignificant for the estimated particle sizes. The time-correlation function of the scattered light intensity was recorded at an angle of 90° (usually in triplicate). The intensity correlation data were analysed with the so-called "CONTIN" software package (S. W. Provencher, Comput. Phys. Commun. 27, 1982) to assess particle size distributions and the average particle size. As diameter estimation from DLS data is inherently intensity-weighted (i.e. weighted to the sixth power of the diameter), it enables to detect the formation of large-sized entities in time. When multimodal size distributions were observed, the average particle diameters of the separate modes were calculated independently.

c) Rheology measurements

Rheological profiles were typically recorded over a shear rate range of 4 decades [0.01–100 s$^{-1}$] by means of a Paar-Physica UDS200 rheometer using a Zldin measuring device in a Couette type configuration. The evolution of the rheological profiles was followed over time to determine the stability range.

The features and specific aspects of the invention will become apparent from the following description of specific examples of the invention. It should be observed that the specific aspects of these examples are only set forth as preferred embodiments of what is meant in the context of the above general disclosure of the invention. These examples should not be interpreted as a limitation of the scope of the invention as such and as expressed in the claims at the end of this specification.

EXAMPLE 1

Preparation of a nanoparticle dispersion of extrusion modified potato starch.

Extrusion Modified Potato Starch (EMPS) was prepared according to the process and the conditions described in Example 1 of EP 99200203 patent application. Prior to dispersion in water, EMPS was cryogenically ground to a fine powder of a mesh size of ≈100 μm. Taking into account the moisture content of EMPS (≈10 wt. %), 16.667 g of EMPS powder was added to 83.333 g of water at room temperature to obtain a preparation with a concentration of 15 wt. % of dry starch. The starch was homogeneously mixed to the water by stirring (600 min$^{-1}$) during 5 minutes. Within ½ hour, the mixture turns to a swollen gel before it eventually collapses into a low-viscous homogeneous transparent dispersion after 2 to 3 hours. The same procedure was repeated for the preparation of 5, 7.5, 10 and 18 wt. % (dry) starch dispersions. Dispersion of EMPS in water takes less time at lower concentrations. The starch dispersions exhibit however a limited storage stability (flocculation and/or gel formation), which depends on the origin of the starch and the concentration of the dispersion.

In Table 1, the average particle size(s), as well as the viscosity at a shear rate of 1 s$^{-1}$ are reported for several EMPS dispersions at increasing time periods.

TABLE 1

| Time (days) | 7.5 wt. % EMPS | | 10 wt. % EMPS | | 15 wt. % EMPS | |
|---|---|---|---|---|---|---|
| | d (nm) | η (mpa.s) (°) | d (nm) | η (mPa.s) (°) | d (nm) | η (mPa.s) (°) |
| 0 | 50 | 18 | — | 46 | 47 | — |
| 1 | 52 | 18 | — | 6210 | 38 | — |
| | | | | | 3112 | |
| 2 | 45 | 23 | — | 10600 | — | — |
| | 11285 | | | | | |
| 4 | — | 290 | — | 18700 | — | — |

(°) Viscosity at 1 s$^{-1}$ shear rate

The particle size as well as the viscosity reflects the limited colloidal stability of the EMPS dispersions as a function of time. Within a few days, the formation of very large starch entities becomes apparent from the dynamic light scattering data. The average size of the observed compounds is returned in Table 1. At 7.5 wt. %, an aqueous EMPS dispersion remains stable for 2 days at most. At higher concentrations, the dispersion stability is less than two days. It is noticed that modifications of the dispersions, such as the appearance of threads, trails or sediments, are clearly visible after two days, even for a 5 wt. % EMPS dispersion.

Insubsequent examples, the time behaviour of water-based starch/synthetic polymer compositions will be compared to the results of Table 1 for the pure EMPS dispersions.

EXAMPLE 2

Stability determination of water-based mixtures of EMPS and polyester-urethane resins.

Aqueous dispersions of polyester-urethanes (in particular from the PUD-Ucecoat range of UCB) were blended with EMPS dispersions, prepared according to example 1.

The polyester-urethane resins with the following compositions were used:

PU1 A poly-ester-urethane consisting of polycaprolactone as a polyol reacted with trimethylxylene diisocyanate, with a molecular weight in the range 50000–200000 g/mole, typically 80000 g/mole.

PU2 A poly-ester-urethane consisting of a fatty acid polyester-polyol reacted with 4–4' methylenedicyclohexyl diisocyanate, with a molecular weight in the range 50000–200000 g/mole, typically 80000 g/mole.

PU3 A poly-ester-urethane consisting of a fatty acid polyester-polyol reacted with 4–4' methylenedicyclohexyl diisocyanate, with a molecular weight in the range 50000–200000 g/mole, typically 80000 g/mole.

PU4 An acrylated poly-ester-urethane consisting of polyadipate (neopentylglycol/adipic acid) as polyol reacted with 4–4' methylenedicyclohexyl diisocyanate.

In these polyurethane dispersions, particle size determination with DLS evidenced bimodal distributions for PU3 and PU4, whereas single sized particles were detected for PU1 and PU2.

The blend compositions listed in Table 2 were tested for stability.

TABLE 2

| | Materials used for mixing | | Mixture | |
|---|---|---|---|---|
| Sample Id. | EMPS dispersion (wt. %) | PU dispersion (wt. %) | Dry solids (wt. %) | Dry starch (wt. %) |
| 3/7 EMPS/PU1 | 18 | 35 (PU1) | 27 | 8.1 |
| 3/7 EMPS/PU2 | 18 | 35 (PU2) | 27 | 8.1 |
| 3/7 EMPS/PU3 | 15 | 35 (PU3) | 25 | 7.5 |
| 5/5 EMPS/PU3 | 15 | 35 (PU3) | 21 | 10.5 |
| 3/7 EMPS/PU4 | 15 | 40 (PU4) | 26.7 | 8.0 |

The dependence of the average particle size as a function of the is shown in Table 3 for the blend compositions of Table 2.

TABLE 3

| Time (days) | 3/7 EMPS/ PU1 d (nm) | 3/7 EMPS/ PU2 d (nm) | 3/7 EMPS/ PU3 d (nm) | 5/5 EMPS/ PU3 d (nm) | 3/7 EMPS/ PU4 d (nm) |
|---|---|---|---|---|---|
| 0 | 270 | 42 | 30 155 | 34 198 | 30 138 |
| 2 | | | | 35 164 | |
| 3 | | | | | 30 135 |
| 5 | | | | 32 189 | |
| 7 | | | | | 31 155 |
| 10 | | | 30 152 | | |
| 28 | 321 | 40 | | | |
| 56 | | 40 | | | |

The average particle sizes do not vary significantly within the investigated time ranges. In contrast to the single EMPS dispersions, the formation of large entities was not observed in these mixtures. Two particle size modes are observed for the blends of EMPS with PU3 or PU4 dispersions and are related to the two particle sizes measured for the pure PU dispersions.

EXAMPLE 3

Stability determination of water-based mixtures of EMPS and poly(styrene)acrylate resins.

A poly(styrene)acrylate latex (in particular from the Ucecryl range of UCB) was blended with a EMPS dispersion, prepared according to example 1.

The poly(styrene)acrylate resin with the following composition was used:

PA1 A polyacrylate emulsion prepared by polymerization of methyl methacrylate, 2-ethylhexylacrylate, acrylic acid and acetyl acetoxy ethyl methacrylate monomers. The weight-average molecular weight of the polymer is in the range 200000–600000 g/mole.

PA2 A polystyreneacrylate emulsion prepared by polymerization of methyl methacrylate, methyl acrylate, styrene, 2-hydroxy ethylacrylate and methacrylic acid monomers. The number- and weight-average molecular weights of the polymer are ≈20000 and 500000 g/mole, respectively.

PA3 A polyacrylate emulsion prepared by polymerization of butyl acrylate, methyl methacrylate and acrylic acid monomers. The number- and weight-average molecular weights of the polymer are ≈60000 and 500000 g/mole, respectively.

From dynamic light scattering measurements, a single fairly monodisperse particle size was found for the aforementioned polyacrylate latices.

The blends with composition given in Table 4 were prepared for stability testing.

TABLE 4

| | Materials used for mixing | | Mixture | |
|---|---|---|---|---|
| Sample Id. | EMPS dispersion (wt. %) | PA emulsion (wt. %) | Dry solids (wt. %) | Dry starch (wt. %) |
| 3/7 EMPS/PA1 | 15 | 30 (PA1) | 23 | 6.9 |
| 3/7 EMPS/PA2 | 15 | 30 (PA2) | 23 | 6.9 |
| 3/7 EMPS/PA3 | 15 | 30 (PA3) | 23 | 6.9 |

The dependence of the average particle size as a function of time is shown in Table 5 for the blend compositions of Table 4.

TABLE 5

| Time (days) | 3/7 EMPS/PA1 d (nm) | 3/7 EMPS/PA2 d (nm) | 3/7 EMPS/PA3 d (nm) |
|---|---|---|---|
| 0 | 124 | 115 | 137 |
| 1 | | 124 | 138 |
| 2 | 126 | 116 | 134 |
| 4 | | 120 | 134 |
| 5 | 130 | | |

Similar to example 1, there is no evidence for the formation of large entities in these mixed systems within the examined time period.

EXAMPLE 4

Stability determination of water-based mixtures of EMPS, polyester-urethanes and polyacrylate resins.

A hybrid polyester-urethane/polyacrylate dispersion was blended with a EMPS dispersion, prepared according to example 1.

The polyacrylate, referred to as PA1 in example 3, and the polyester-urethane resin with the following composition were used:

PU5 A poly-ester-urethane consisting of polyadipate (neopentylglycol/adipic acid) as polyol reacted with 4–4' methylenedicyclohexyl diisocyanate, with a molecular weight in the range 50000–200000 g/mole, typically 80000 g/mole.

The particles in an aqueous PU5 dispersion have a uniform size, as inferred from DLS measurements.

The blend compositions listed in Table 6 were prepared for stability testing.

TABLE 6

| Sample Id. | Materials used for mixing | | | Mixture | |
| --- | --- | --- | --- | --- | --- |
| | EMPS dispersion (wt. %) | PU dispersion (wt. %) | PA Emulsion (wt. %) | Dry solids (wt. %) | Dry starch (wt. %) |
| 37/63 EMPS/H1 | 15 | 30 (PU5) | 49 (PA1) | 25 | 9.2 |
| 22/78 EMPS/H1 | 15 | 30 (PU5) | 49 (PA1) | 30 | 6.6 |

The dependence of the average particle size as a function of time is shown in Table 7 for the blend compositions of Table 6.

TABLE 7

| Time (days) | 37/63 EMPS/H1 d (nm) | 22/78 EMPS/H1 d (nm) |
| --- | --- | --- |
| 0 | 144 | 129 |
| 3 | 137 | 137 |
| 34 | 146 | 134 |

For these blends, only a single broad size peak could be determined. This is likely due to the closeness of the particle sizes of the individual compounds of the blends. The average value of the peak did not vary substantially in the investigated time period and no further peaks were detected.

EXAMPLE 5

Stability determination of water-based mixtures of EMPS and styrene-butadiene resins.

Commercial styrene-butadiene latices (kindly provided by REICHROLD) were blended with a EMPS dispersion, prepared according to example 1.

The styrene-butadiene latices with the following specifications were used:
SBR1 A carboxylated styrene-butadiene latex binder for pigmented paperboard coatings (Tylac® 029; $T_g$=13° C.)
SBR2 A carboxylated styrene-butadiene latex binder for pigmented paper coatings (Tylac® 757; $T_g$=−9° C.).
SBR3 A highly carboxylated styrene-butadiene latex binder for free sheet applications (Tylac® 936; $T_g$=1° C.).
The blends with composition given in Table 8 were prepared for stability testing.

TABLE 8

| Sample Id. | Materials used for mixing | | Mixture | |
| --- | --- | --- | --- | --- |
| | EMPS dispersion (wt. %) | SBR latex (wt. %) | Dry solids (wt. %) | Dry starch (wt. %) |
| 3/7 EMPS/SBR1 | 15 | 31 (SBR1) | 23.5 | 7.0 |
| 3/7 EMPS/SBR2 | 15 | 33 (SBR2) | 24.0 | 7.2 |
| 3/7 EMPS/SBR3 | 15 | 30 (SBR3) | 23.0 | 6.9 |

The dependence of the average particle size as a function of time is shown in Table 9 for the blend compositions of Table 8.

TABLE 9

| Time (days) | 3/7 EMPS/SBR1 d (nm) | 3/7 EMPS/SBR2 d (nm) | 3/7 EMPS/SBR3 d (nm) |
| --- | --- | --- | --- |
| 0 | 129 | 185 | 121 |
| 1 | 129 | 186 | 128 |
| 5 | 131 | 184 | 124 |

The conclusions are similar to those of example 3.

EXAMPLE 6

Stability determination of water-based mixtures of EMPS and epoxy resins.

An aqueous epoxy resin dispersion (from Vianova Resins) was blended with a EMPS dispersion, prepared according to example 1.

A commercial epoxy resin with the following characteristics was used:
ER1 An ethoxy- and propoxylated bisphenol A epoxy resin (Beckopox® EP 385w).

The blend with composition given in Table 10 was prepared for stability testing.

TABLE 10

| Sample Id. | Materials used for mixing | | Mixture | |
| --- | --- | --- | --- | --- |
| | EMPS dispersion (wt. %) | ER dispersion (wt. %) | Dry solids (wt. %) | Dry starch (wt. %) |
| 3/7 EMPS/ER1 | 15 | 30 (ER1) | 23 | 6.9 |

The dependence of the average particle size as a function of time is shown in Table 11 for the blend composition of Table 10.

TABLE 11

| Time (days) | 3/7 EMPS/ER1 d (nm) |
| --- | --- |
| 0 | 412 |
| 1 | 439 |
| 6 | 421 |

Again, there was no evidence of additional peaks, nor a significant variation in the average particle size during time.

EXAMPLE 7

Stability determination of aqueous mixtures of EMPS and epoxy-acrylate resins.

An radiation-curable epoxy-acrylate resin as aqueous dispersion (from UCB) was blended with a EMPS dispersion, prepared according to example 1.

A typical epoxy-acrylate resin with the following characteristics was used:
EAR1 An acrylated bisphenol A epoxy resin (Ebecryl® 3700). The bisphenol A epoxy compound results from the condensation of epichlorohydrin with bisphenol A. Subsequent acrylation then yields a reactive low-molecular-weight oligomer.

The blend with the composition given in Table 12 was prepared for stability testing.

TABLE 12

| Sample Id. | Materials used for mixing | | Mixture | |
|---|---|---|---|---|
| | EMPS dispersion (wt. %) | EAR dispersion (wt. %) | Dry solids (wt. %) | Dry starch (wt. %) |
| 3/7 EMPS/EAR1 | 15 | 20 (EAR1) | 18.2 | 5.5 |

The dependence of the average particle size as a function of time is shown in Table 13 for the blend composition of Table 12.

TABLE 13

| Time (days) | 3/7 EMPS /EAR1 d (nm) |
|---|---|
| 0 | 755 |
| 3 | 730 |
| 5 | 760 |

The conclusions are similar to previous examples.

EXAMPLE 8

Stability determination of an ink formulation comprising EMPS.

An ink formulation was prepared by gently mixing the following ingredients:
(a) 100 parts of resin 3/7 EMPS/PU3 (cf. example 2)
(b) 100 parts of a 50 wt. % aqueous dispersion of Phthalocyanine blue-15 pigments (Microsol Unisperse from CIBA-grades BE and GP-I).

The solid content of this preparation was ≈33% by weight, comprising 3.8% by weight of starch. According to visual appreciation, the formulation remains fluid for more than two months. The ink can be applied on paper without substantial loss of properties, with respect to an analogous formulation without EMPS.

EXAMPLE 9

Stability determination of a paint formulation comprising EMPS.

A paint formulation was prepared by gently mixing the following ingredients:
(a) 100 parts of resin 3/7 EMPS/PU3 (cf. example 2)
(b) 3 parts of coalescence agents
(c) 1 part of matting agent
(d) 0.3 parts of anti-foam agent
(e) 10 parts of white iron-oxide pigment paste The resin content of this preparation was ≈22% by weight, comprising 6.6% by weight of starch. According to visual appreciation, the formulation remains fluid for more than two weeks.

EXAMPLE 10

Overview of the stability range for the tested water-based polymer compositions containing extruded modified starch, prepared along the lines of example 1.

TABLE 14

| Composition | Starch content (wt. %) | Stability range (days) | Method of testing |
|---|---|---|---|
| EMPS | 7.5 | <2 | DLS, Rheology |
| EMPS | 10 | <1 | DLS, Rheology |
| 3/7 EMPS/PU1 | 8.1 | >28 | DLS |
| 3/7 EMPS/PU2 | 8.1 | >56 | DLS |
| 3/7 EMPS/PU3 | 7.5 | >10 | DLS |
| 5/5 EMPS/PU3 | 10.5 | >5 | DLS |
| 3/7 EMPS/PU4 | 8.0 | >7 | DLS |
| 3/7 EMPS/PA1 | 6.9 | >5 | DLS |
| 3/7 EMPS/PA2 | 6.9 | >4 | DLS |
| 3/7 EMPS/PA3 | 6.9 | >4 | DLS |
| 37/63 EMPS/H1 | 9.2 | >34 | DLS |
| 22/78 EMPS/H1 | 6.6 | >34 | DLS |
| 3/7 EMPS/SBR1 | 7.0 | >5 | DLS |
| 3/7 EMPS/SBR2 | 7.2 | >5 | DLS |
| 3/7 EMPS/SBR3 | 6.9 | >5 | DLS |
| 3/7 EMPS/ER1 | 6.9 | >6 | DLS |
| 3/7 EMPS/EAR1 | 5.5 | >5 | DLS |
| Ink formulation | 3.8 | >15 | Visual |
| Paint formulation | 6.6 | >60 | Visual |

What is claimed is:

1. Water based polymer composition comprising a biopolymer and a synthetic polymer resin, wherein
   the biopolymer having a particle size in the submicron range with an average particle size of less than 200 nm, results from a mechanical thermoplastic processing of a polysaccharide and/or protein starting material using shear forces of at least 500 J of specific mechanical energy per g of biopolymer, in the presence of a crosslinking agent, and
   the synthetic polymer resin consists of a water based hydrophilic resin and/or hydrophilic hydrophobic resin.

2. Polymer composition according to claim 1, wherein the water based polymeric resin is in the form of a solution, or a dispersion, or an emulsion or a colloid.

3. Polymer composition according to claim 1, wherein the polymer resin is an anionic, cationic and/or nonionic modified resin.

4. Polymer composition according to claim 2, wherein the polymer resin is an anionic, cationic and/or nonionic modified resin.

5. Polymer composition according to claim 1 wherein the water based resin is selected from polyurethanes, polyesters, polyethers, polyester-urethanes, polyacrylates, polyvinylacrylates, polystyreneacrylates, styrene-butadiene, poly(meth)acrylic acid, polyvinylalcohols, polyvinylacetates, polyvinylethers, polyethylenevinylacetates, polyethylenevinylalcohols, epoxy resin, alkyds, epoxy-, urethane-, polyester, amino-, and amido (meth)acrylates, or mixtures thereof.

6. Polymer composition according to claim 2 wherein the water based resin is selected from polyurethanes, polyesters, polyethers, polyester-urethanes, polyacrylates, polyvinylacrylates, polystyreneacrylates, styrene-butadiene, poly(meth)acrylic acid, polyvinylalcohols, polyvinylacetates, polyvinylethers, polyethylenevinylacetates, polyethylenevinylalcohols, epoxy resin, alkyds, epoxy-, urethane-, polyester, amino-, and amido-(meth)acrylates, or mixtures thereof.

7. Polymer composition according to claim 3 wherein the water based resin is selected from polyurethanes, polyesters, polyethers, polyester-urethanes, polyacrylates, polyvinylacrylates, polystyreneacrylates, styrene-butadiene, poly(meth)acrylic acid, polyvinylalcohols, polyvinylacetates, polyvinylethers, polyethylenevinylacetates, polyethylenevinylalcohols, epoxy resin, alkyds, epoxy-, urethane-, polyester, amino-, and amido-(meth)acrylates, or mixtures thereof.

8. Polymer composition according to claim 4 wherein the water based resin is selected from polyurethanes, polyesters, polyethers, polyester-urethanes, polyacrylates, polyvinylacrylates, polystyreneacrylates, styrene-butadiene, poly(meth)acrylic acid, polyvinylalcohols, polyvinylacetates, polyvinylethers, polyethylenevinylacetates, polyethylenevinylalcohols, epoxy resin, alkyds, epoxy-, urethane-, polyester, amino-, and amido-(meth)acrylates, or mixtures thereof.

9. Polymer composition according to claim 5, wherein said water based resins is selected from polyurethanes, polyester-urethanes, epoxy-acrylates, polyester-acrylates, urethane-acrylates, polyacrylates, polystyrene-acrylates, styrene-butadiene and epoxy resin or mixtures thereof.

10. Polymer composition according to claim 5, wherein said water based resins comprise functional groups, such as hydroxyl, methylol, carbonyl, carboxyl, sulfonyl, amino, epoxy, acetyl acetoxy, (meth)acrylic and/or vinylic groups.

11. Polymer composition according to claim 1, wherein the biopolymer nanoparticles result from a mechanical thermoplastic processing of biopolymers selected from polysaccharides and/or from cereal, vegetable or animal proteins and mixtures and/or modified derivatives thereof.

12. Polymer composition according to claim 11, wherein the biopolymer is native or modified starch from tuber or cereal origin.

13. Polymer composition according to claim 12 wherein the starch is a starch-ether, starch-ester or oxidized starch.

14. Polymer composition according to claim 12 wherein the starch is from potato, waxy maize, tapioca or rice.

15. Polymer composition according to claim 1 wherein the biopolymer nanoparticles result from a mechanical thermoplastic processing comprising a crosslinking step using a cross-linking agent.

16. Polymer composition according to claim 15, wherein the cross-linking agent is a polyaldehyde.

17. Polymer composition according to claim 1 wherein the wt. % of the total dry resin with respect to the water based composition ranges from 5 to 40%.

18. Polymer composition according to claim 17, wherein the wt. % of the total dry resin with respect to the water based composition ranges from 5 to 30%.

19. Polymer composition according to claim 17 wherein the total dry resin with respect to the water based composition ranges from 5 to 20%.

20. Polymer composition according to claim 1 wherein the total dry resin with respect to the water based composition ranges from 5 to 20%.

21. Polymer composition according to claim 11, wherein the polysaccharide is select from starch, cellulose, hemicellulose and gums.

22. Polymer composition according to claim 11, wherein the protein is selected from wheat gluten, whey protein and gelatin.

23. Polymer composition according to claim 15, wherein the cross-linking agent is glyoxal.

* * * * *